July 23, 1940.  W. TYDON  2,208,690

CHECK VALVE

Filed Aug. 25, 1938

INVENTOR
WALTER TYDON
BY
ATTORNEY

Patented July 23, 1940

2,208,690

UNITED STATES PATENT OFFICE 2,208,690

CHECK VALVE

Walter Tydon, Kenmore, N. Y., assignor to Curtiss-Wright Corporation, a corporation of Delaware Application August 25, 1938, Serial No. 226,639

3 Claims. (Cl. 251—144)

This invention relates to improvements in check valves particularly adapted for use in hydraulic systems in which high pressures are maintained and in which the rate of fluid flow is moderate.

The hydraulic systems used in aircraft for remote control purposes frequently operate at pressures of the order of 600 lbs./sq. in., and the various components of the system are required to be extremely light in weight. Check valves are used in certain parts of the system, and it has been found difficult to maintain a complete and effective seal in these check valves when they are of the conventional poppet or ball type. Accordingly, an object of this invention is to provide a check valve which will seal effectively under all conditions of operation and will even seal when the hydraulic fluid may carry solid particles which may become lodged between the valve and its seat.

A further object of the invention is to provide a valve element which is capable of sustaining the high pressure loads imposed thereon while at the same time elastically sealing against the valve seat to the elimination of leakage.

A further object is to provide a composite valve element comprising a rubber sealing device and a metal stress-sustaining device, the rubber likewise providing for an elastic pressure on the valve seat to hold the valve in sealing position.

Further objects and advantages will be apparent from a reading of the annexed specification and claims, together with an examination of the accompanying drawing, in which:

Figure 1:
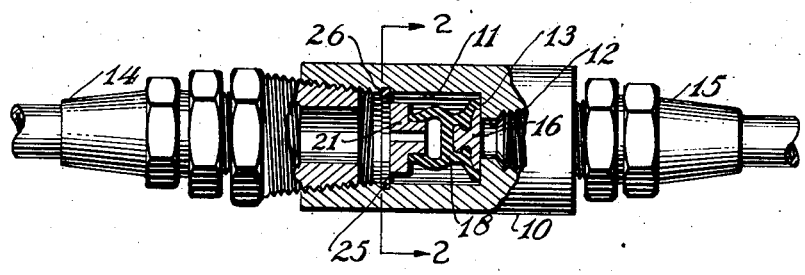
Fig. 1 is a longitudinal section through a check valve assembly.
Figure 2:
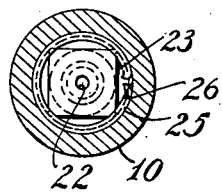
Fig. 2 is a section on the line 2—2 of Fig. 1.
Figure 3:
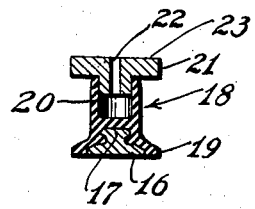
Fig. 3 is an axial section through the valve element alone.
Figure 4:
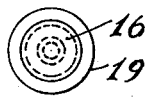
Fig. 4 is a bottom view of the valve as indicated in Fig. 3.

In the figures, 10 represents a valve body comprising a cylindrical element having an enlarged cylindrical bore 11 communicating with a smaller cylindrical bore 12, defining therebetween a shoulder 13 which forms a valve seat. Tubing fittings 14 and 15 are screwed into the ends of the valve body by which the valve may be connected into a hydraulic system.

The valve element comprises a metallic disc 16 having a button 17 formed thereon, the flat face of the disc 16 being of sufficient diameter to bridge the bore 12 and to rest upon the shoulder 13 which forms the valve seat. The sealing element of the valve comprises a cylindrical rubber part 18 having an annular flange 19 at one end and a recess formed in complement to the profile of the metallic element 16—17 so that said element may be snapped into the rubber and when assembled, the flange 19 circumscribes the disc 16. The opposite end of the part 18 is provided with a cylindrical bore 20, defining a sleeve within which is fitted an abutment 21 having a central perforation 22 and having a squared flange 23 engageable in the bore 11. The assembly of the rubber part 18 and the abutment 21 may be inserted into the bore 11 in the body and a snap ring 25 is inserted into an annular groove 26 formed in the bore 11 to provide an inwardly projecting flange against which the corners of the squared portion 23 may rest. The axial spacing from the shoulder 13 to the ring 25 will be such as to slightly compress the rubber part 18, the elastic properties of the rubber comprising a spring to hold the valve against the shoulder 13.

In operation, back pressure will exist in the bore 11, this pressure acting upon the exposed parts of the flange 19 to hold the rubber flange firmly in engagement with the valve seat. The metallic disc 16, bridging the bore 12, provides a strong closure for the bore 12 resisting the back pressure. If a pressure greater than the amount of back pressure exists in the bore 12, the valve will be lifted from its seat, deforming the sleeve portion of the rubber part and allowing fluid flow from right to left, as shown in Fig. 1. Upon cessation of excess pressure in the bore 12 the valve will immediately be returned to its seat. The opening 22 in the abutment 21 permits of pressure equalization between the inner and outer portions of the rubber sleeve so that the spring effect of the rubber sleeve toward seating the valve is independent of pressure conditions existing in the bore 11.

By the use of the rubber sealing flange 19, the necessity for a perfectly polished seat in the valve is overcome, since the rubber will extrude into any slight depressions in the seat and likewise is capable of extruding around any foreign matter which may lie upon the surface of the seat, whereby the valve will be tight under all conditions.

Although rubber has been mentioned in the foregoing as a material for the element 18, other materials may be used in place thereof, so long as such materials have the desired elastic properties and stability in the presence of the hydraulic fluids used and under the conditions encountered in operation. Where the word rubber is used, it is to be read as including synthetic rubber products and compounds having physical characteristics generally similar to those of rubber.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. As an article of manufacture, a check valve comprising a rubber body formed as a cylinder having a flange at one end, the cylinder having a flange-end recess, a metallic core within said recess, the end faces of the rubber flange and core being substantially coplanar, said rubber body having a sleeve portion at the end opposite the flange, and a metallic abutment embraced by said sleeve portion and isolated from said core by the rubber of the sleeve, the latter comprising a spring urging said core and abutment apart.

2. A check valve assembly comprising a valve body having an annular seat and an abutment spaced therefrom, a rubber sealing element sleeved to embrace said abutment and pressing against said seat, and a metallic insert in the rubber sealing element bridging the opening of said valve seat, said rubber element having a sealing flange embracing said insert and bearing upon the valve seat radially outward of contact of the insert with the seat, the rubber between said seat and abutment comprising a compression valve seating spring.

3. A check valve assembly comprising a valve body having an annular seat and an abutment spaced therefrom, a rubber sealing element engaging said abutment and pressing against said seat, and a metallic insert in the rubber sealing element bridging the opening of said valve seat, said rubber element having a sealing flange embracing said insert and bearing upon the valve seat radially outward of contact of the insert with the seat, said abutment comprising a plug engageable in the rubber sealing element, and a snap ring engaged in a body groove against which said bushing engages.

WALTER TYDON.